United States Patent Office 3,348,927
Patented Oct. 24, 1967

3,348,927
COMPOSITION AND PROCESS
Margot Becke, Heidelberg, Germany, assignor to Olin Mathieson Chemical Corporation, a corporation of Virginia
No Drawing. Filed Nov. 29, 1962, Ser. No. 241,026
3 Claims. (Cl. 23—357)

This invention relates to a novel composition and method for preparing it. The novel composition has the empirical formula $P_3N_2SCl_7$. It is believed to have the structural formula $Cl_3P:N.PCl_2:N.P(S)Cl_2$. The novel process of preparing the compound comprises reacting at least a stoichiometric amount and preferably an excess of hydrogen sulfide with the compound $P_4N_2Cl_{14}$. The $P_4N_2Cl_{14}$ starting material is prepared in known manner, for example, from ammonium chloride and $PCl_5$ in an inert solvent as described and claimed in my co-pending application Ser. No. 209,267 filed July 11, 1962.

The reaction involved is represented by the following equation:

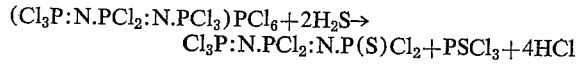
$$Cl_3P:N.PCl_2:N.P(S)Cl_2+PSCl_3+4HCl$$

At least the stoichiometric ratio of hydrogen sulfide as required by the above equation is used. Excess does no harm.

The $P_4N_2Cl_{14}$ reacts without solvent at substantially room temperature and atmospheric pressure with gaseous hydrogen sulfide to form $P_3N_2SCl_7$, $PSCl_3$ and HCl. The reaction suitably can be accelerated by heating at temperatures up to about 100° C. However, the reaction proceeds even at temperatures as low as 0° C. Superatmospheric pressures can be used to accelerate the reaction.

During the reaction, the mixture liquefies and the reaction is complete when a drop of the liquid dissolves completely in carbon tetrachloride to form a clear solution. The reaction mixture is then evaporated under reduced pressure to remove by-products and to recover the product. It is usually obtained as a yellow oil but occasionally is bluish. The oil usually crystallizes and then melts at 22° to 23° C.

The new compound is a liquid above its melting point of 22 to 23° C. It is readily soluble in benzene, chloroform, tetrachloride, carbon tetrachloride and nitrobenzene. It is slightly soluble in cold petroleum ether but readily soluble in hot petroleum ether. The $P_3N_2SCl_7$ compound of this invention is an acid chloride very susceptible to hydrolysis. However, the nitrogen-phosphorus bonds are both very resistant to hydrolysis. The compound reacts readily with dimethylamine to form the compound $R_3P:N.PR_2:NP(S)R_2$ where the R's are dimethylamino groups. This is an active insecticide.

Example I

A slow stream of dry hydrogen sulfide was passed under anhydrous conditions through 64.8 grams (0.1 mole) of $P_4N_2Cl_{14}$ in a flask fitted with a gas inlet tube extending to the bottom of the flask and a gas outlet tube. The reaction mixture liquefied and became warm. When the evolution of heat diminished, the mixture was heated to 50 to 60° C. and was shaken occasionally. The reaction was complete when all of the crystals were converted into a yellow oil and a drop showed complete solubility in carbon tetrachloride. By-products were removed by heating the oil at 50° C. under a pressure of 0.1 mm. Hg. The residual golden brown oil crystallized on cooling and then melted at 22° to 23° C.

Analysis for.—$P_3N_2SCl_7$: Calc.: P, 23.16; N, 6.98; S, 7.99; Cl, 61.86. Found: P, 22.8; N, 6.9; S, 8.0; Cl, 59.6.

The molecular weight, determined cryoscopically in benzene, was 422 compared with calculated 401.

Yield, 33.8 grams or 84 percent of theory.

What is claimed is:

1. A composition of matter having the formula $P_3N_2SCl_7$, said $P_3N_2SCl_7$ prepared by the process of claim 2.

2. Method of preparing the compound of claim 1 which comprises reacting $P_4N_2Cl_{14}$ with at least 2 moles of hydrogen sulfide per mole of said $P_4N_2Cl_{14}$ and evaporating the reaction mixture under subatmospheric pressure to remove by-products and to recover the product.

3. Process of claim 2 in which the reaction is carried out at temperatures between 0° and 100° C.

References Cited

Becke-Goehring et al., "Zeitschrift fur Angewandte Chemie, vol. 74, pp. 382–386 (June 7, 1962).

Fluch, "Zeitschrift fur Anorganische und Allgemeine Chemie," vol. 315, pp. 181–190 (June 1962).

MILTON WEISSMAN, Primary Examiner.